United States Patent Office 3,703,573
Patented Nov. 21, 1972

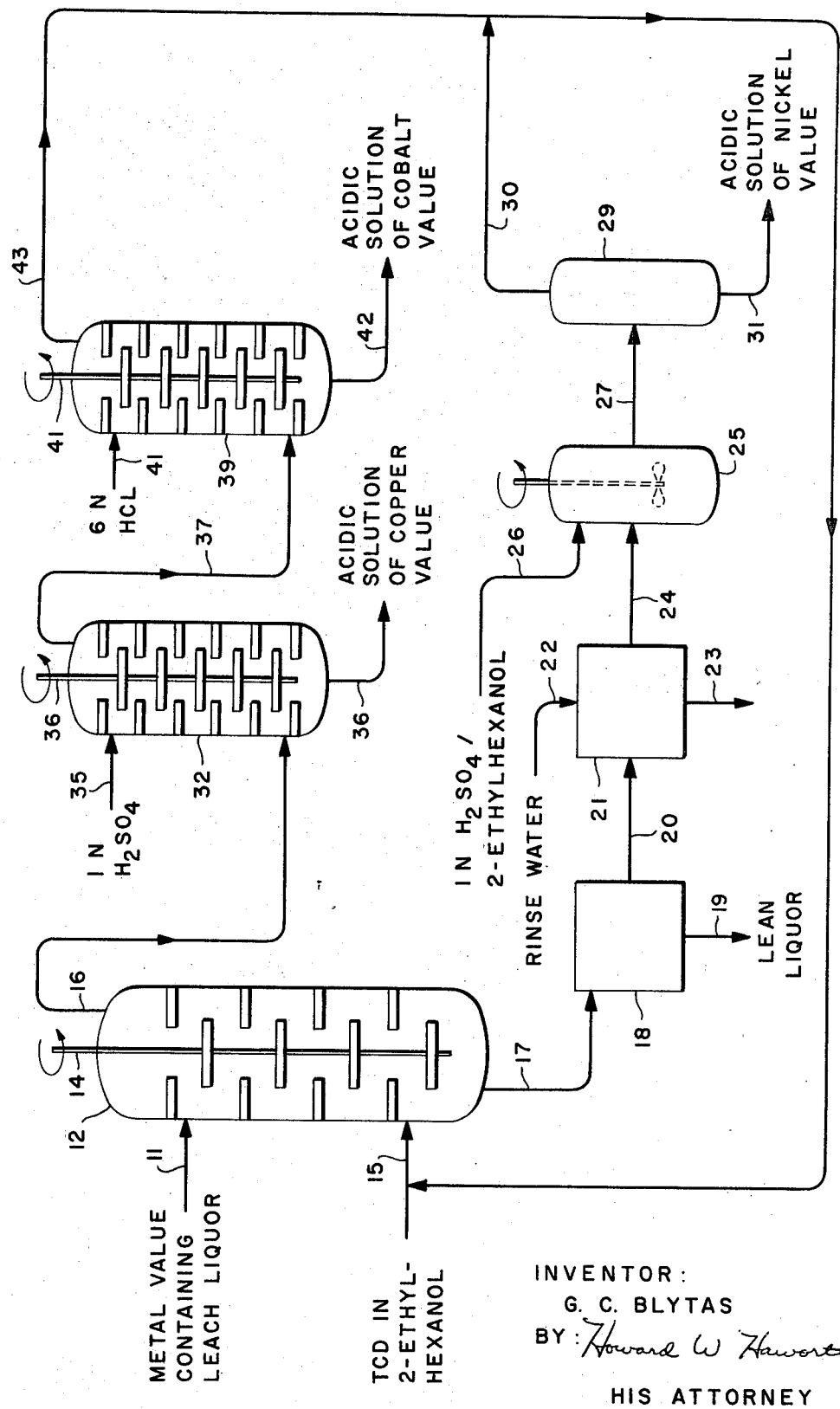

3,703,573
PROCESS FOR EXTRACTING COPPER, COBALT AND NICKEL VALUES FROM AQUEOUS SOLUTION
George C. Blytas, Kensington, Calif., assignor to Shell Oil Company, New York, N.Y.
Filed Aug. 5, 1971, Ser. No. 169,423
Int. Cl. C01g 3/00, 51/00, 53/00
U.S. Cl. 423—24
7 Claims

ABSTRACT OF THE DISCLOSURE

4 - alkyl - 1,2-cyclohexanedione dioximes selectively extract copper, cobalt and nickel values from aqueous solutions of pH 2–9.

BACKGROUND OF THE INVENTION

Field of the invention

This invention relates to the recovery of copper, cobalt and nickel values from aqueous solutions by a liquid/liquid extraction process employing certain novel cyclohexanedione dioxime extractants.

The Prior art

It is known that liquid/liquid extraction can be an effective method to recover metal values from aqueous solutions, such as the solutions which result from the leaching of ores. A variety of ligands have been proposed for such liquid/liquid extractions. Among these are certain compounds having oxime groups (C=N—OH) as functional groups. It is recognized, however, that the exact nature of the oxime ligands employed is very critical to the efficiency of their use in metal value extractions. A change in oxime ligand structure can, for example, change the conditions, such as pH, at which the ligand is effective or the metal values with which it will complex. U.S. 3,224,873, issued December 21, 1965, to R. R. Swanson, discloses the use of certain hydroxy-oximes (dialkyl ketoximes) as ligands to extract copper. These materials are effective at high pH's, for example, above about pH 4, but are not suited for lower pH applications. Similarly, U.S. 3,428,449, issued February 18, 1969, to R. R. Swanson deals with the extraction of copper with substituted hydroxybenzophenoximes having the structural formula:

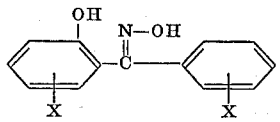

wherein X represents from 0 to 4 substituents.

These materials are somewhat more effective at low pH's but are very slow to form complexes. Also, these known ligands, while useful for extracting copper values, are not effective for extracting nickel and cobalt values from other metal values such as iron or magnesium values. Since copper, cobalt and nickel are found together in many ores, for example, in crude nickel laterites, pentlandites, and chalcopyrites, and are often separated from such ores together with these less desirable metals when acid or ammoniacal leaches are employed, a ligand which would enable simultaneous selective recovery of nickel and cobalt values as well as copper values from a variety of leach liquors would be highly desirable.

STATEMENT OF THE INVENTION

It has now been found that copper, cobalt and nickel values are selectively extracted from aqueous solutions which have pH's in the range pH 2 to pH 9 and which additionally contain iron and/or magnesium values by contact with nonaqueous water-immiscible solutions of 4-alkyl-1,2-cyclohexanedione dioximes.

BRIEF DESCRIPTION OF THE DRAWING

This invention will be described with reference to the accompanying drawing wherein the sole figure represents a more or less diagrammatic elevational view of one apparatus suitable for practicing the instant metal extraction.

DESCRIPTION OF PREFERRED EMBODIMENTS

The extracting agents and their preparation

The extracting agents of this invention consist essentially of at least one 4-alkyl-1,2-cyclohexanedione dioxime employed in a water-immiscible nonaqueous solvent. The dione dioximes are represented by the structural formula:

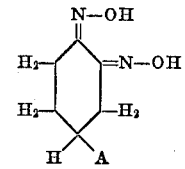

which for the purposes of this invention is also represented by the simplified formula,

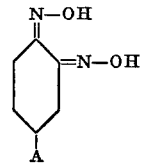

wherein A is a lower alkyl group most suitably of from 3 to about 12 carbon atoms preferably of from about 4 to 8 carbon atoms, very preferably a branched lower alkyl group of from 3 to 6 carbon atoms, and, most preferably a tertiary butyl group.

The dione dioxime extracting agents form essentially water-insoluble chelate complexes with copper, cobalt, and nickel values when they are contacted with an aqueous solution of these values. These complexes are represented by the simplified structural formula:

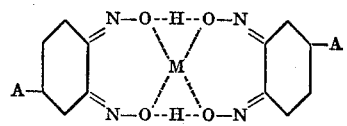

wherein the A's independently are a lower alkyl as already defined and M is a bivalent metal ion selected from the group of copper II, cobalt II and nickel II. It is believed that these chelate complexes, as well as the dione dioximes of this invention from which they formed, are novel materials.

The dione dioxine extracting agents of this invention can be prepared by the following process:

First, the corresponding 4-alkyl-cyclohexan-1-one is obtained. Many of these monoketones are available commercially. They all are produced by hydrogenating the corresponding alkylphenol and then oxidizing the resulting cycloalcohol to the monoketone.

Next, the monoketone is stereospecifically oxidized to the corresponding 1,2-diketone. This oxidation is carried out with high selectivity by contacting the ketone with selenium dioxide. This general oxidation procedure is detailed in an article by Hack et al. appearing at 35 Organic Syntheses 32 (1952). After this reaction is completed, the diketone is freed from any selenium compounds and added to hydroxylamine to form the dioxime. The dioxime is separated by evaporating the water which forms and any solvents.

The dione dioxime extracting agent is employed in a non-aqueous solution. As solvents for this solution are employed materials which are liquid at ambient conditions and will dissolve at least about 0.1 gram equivalent weights per liter (g.e.w./l.) of dione dioxime. Dione dioximes having large alkyl substituents, such as with 6 to 12 carbon atoms, are hydrophobic enough to sufficiently dissolve in nonpolar solvents such as aliphatic, cycloaliphatic and aromatic hydrocarbons, for example, benzene, toluene, the xylenes and aromatic fractions containing the same, octane, decane and the like and hydrocarbon fractions such as kerosene. More polar solvents are generally preferred, however, as they give adequate solubilities for even the short alkyl chain (3–6 carbon atoms) dione dioximes. These preferred solvents include the essentially water-insoluble alkanols and alkanones. These preferred solvents generally have from about 5 to 10 carbon atoms per molecule. Preferably they are nonlinear monoalkanols having from about 6 to about 10 carbons atoms, for example, benzyl alcohol, 2-ethylhexanol, 2,3,3 - trimethylbutan - 2 - ol, 3-methylpentanol, the branched nonanols and the like. A most preferred solvent for the dione dioximes is 2-ethylhexanol. This material has a low solubility in water and dissolves appreciable amounts of all the dione dioxime extracting agents. Mixtures of materials may be employed as solvents. The concentration of the dione dioxime in the extracting solution is very suitable from about 0.05 g.e.w./l. to about 0.6 g.e.w./l. Preferably, the concentration is from about 0.1 g.e.w./l. to about 0.5 g.e.w./l.

The metal value-containing aqueous solution

The aqueous solutions from which the metal values are extracted in accord with this invention have pH's in the range of from about pH 2 to about pH 9. The optimal pH range will depend on the specific metal separations and/or recoveries desired. The solutions contain copper, cobalt and/or nickel values. Other metal values may be present in these solutions, for example, iron values, magnesium values, and values of the alkali metals or alkaline earth metals.

The metal value recovery process

The metal value recovery process in accord with this invention comprises the steps of: (a) contacting a copper, cobalt and/or nickel value-containing aqueous solution with a non-aqueous solution of dione dioxime thereby selectively forming dione dioxime complexes of the copper, cobalt and/or nickel values, (b) separating the dione dioxime complexes of copper, cobalt and/or nickel and the non-aqueous solution from the aqueous solution which may contain other non-complexed metal values and (c) liberating the copper, cobalt and/or nickel values from their complexes either individually or simultaneously.

The first recovery step is effected by contacting the solution of dione dioxime and the metal value-containing aqueous solution in a batch type or continuous process. In the latter modification, a several stage continuous countercurrent extraction is preferred. In any modification, agitation is provided during the process to ensure adequate intimate phase contact. This agitation, frequently in the form of vigorous stirring, is usually continued until the dione dioxime has selectively formed complexes with the copper, cobalt, and/or nickel values and equilibrium between the phases has been established, generally a period of several minutes. Any emulsion which may form during contacting is broken, if required, in conventional manners by adding demulsifying agents. Troublesome emulsions are not frequently encountered, however, and the extraction proceeds smoothly, as a rule, at ambient or any other convenient temperature at which the aqueous feed and the extracting liquid are liquid. Preferred temperatures, are from 15° C. to about 60° C. The amount of dione dioxime employed is not critical. Generally, however, it is most suitable to use at least two moles of dione dioxime for each mole of metal value to be extracted. Use of from 2 to 5 moles of dione dioxime per mole of metal value to be extracted is preferred.

In the next step, the dione dioxime complexes of the copper, cobalt and/or nickel values and the nonaqueous solution are separated from the now copper, cobalt and nickel-value-lean aqueous solution. In most cases, the metal value-dione dioxime complexes are preferentially soluble in the non-aqueous phase so that this separation may be effected simply using phase separators, settling basins and the like. The nickel value complexes formed with the lower alkyl (3–6 carbon atoms) cyclohexane dione dioximes, however, are solids which are essentially insoluble in either liquid phase. In this case, the solid precipitate must be segregated by filtering, settling, centrifuging or like methods.

In the third step of the present process, the metal values are freed from their complexed state. This may be carried out by contacting the complexes, both the solid nickel complexes and the dissolved copper and cobalt complexes, with strong mineral acids such as nitric acid, hydrochloric acid, sulfuric acid and the like. Nickel and copper are freed from dione dioxime complexes by contact with 1 to 2 normal acids while the cobalt complexes require 5 to 6 normal acids to be decomposed. It is thus possible to selectively back-extract the three metal values. The nickel value, separately recovered as a solid complex, is freed by 1–2 normal acid treatment. The copper and cobalt values are separately recovered by treating the non-aqueous solution of their complexes first with 1–2 normal acid to free the copper values, removing the acidic copper value-containing aqueous solution and then treating the dione dioxime extract with 5–6 normal mineral acid to recover the cobalt values. Simultaneous recovery may be effected by treating the complexes as a mixture with 5–6 normal mineral acid. Following the acid treatment, the freed dione dioxime is separated and recycled while the metal values are recovered from the resulting acidic aqueous solutions by cementation, hydrogen reduction, electrolysis, or other conventional means.

In a most preferred embodiment, the dione dioxime extracting agents are employed to recover copper, cobalt and nickel values from the pH 8–9 liquid resulting from the ammoniacial leaching of sulfidic (pentandite type) copper/nickel ores. This embodiment will be described with reference to the figure. Turning now to the figure, a liquid ammoniacal leach solution containing about 1% by weight copper II value, 0.2% by weight of cobalt II value 1% by weight of nickel II value and about 0.1% by weight of iron and magnesium values and having a pH of about 8.5 is introduced via line 11 into the upper section of vertical rotating disc contactor 12 which defines a contacting zone and is provided with stators and an axially positioned rotor 14. An extractant solution of 0.15 g.e.w./l. of 4-tertiary butyl-1,2-cyclohexanedione dioxime (TCD) in 2-ethylhexanol is introduced into a lower section of contactor 12 via line 15 and ascends in countercurrent through the leach solution. Contractor 12 functions as a mixer, intimately contacting the two liquids. The volume ratio of organic phase to aqueous phase is about 6:1. As the two phases contact, the copper, cobalt, and nickel values in the aqueous phase form complexes with the TCD. Contactor 12 also functions as a separator. At the top of contactor 12 a copper- and cobalt-complex fat nonaqueous extract phase is separated and removed via line 16. The aqueous raffinate together with solid nickel complex precipitate is removed via line 17 to filter 18 where the aqueous raffinate is separated and removed via lines 19. The nickel complex is passed via line 20 to washer 21 where water added via line 22 rinses off the residual raffinate for removal through line 23. The rinsed solid nickel complex is passed via line 24 to mixer 25 where it is contacted with a mixture of aqueous 1 normal sulfuric acid and 2-ethylhexanol supplied via line 26. The acid breaks down the complex, freeing the metal values and the TCD ligand. The acidic mixture of metal values and TCD ligand is passed from mixer 25 via line 27 to phase separator 29. TCD in 2-ethylhexanol is separated and removed via line 30 while the sulfuric acid solution of nickel value is removed via line 31. The copper and cobalt value-rich extract separated in contactor 12 is passed via line 16 to rotating disc contactor 32, which is equipped with stators and rotor 34, where it is contacted in countercurrent with 1 normal sulfuric acid supplied via line 35. Contactor 32 also functions as a phase separator permitting the separation of an acidic aqueous phase rich in copper value which is removed via line 36, and the cobalt complex-rich, copper value-lean nonaqueous phase which is removed via line 37. The nonaqueous phase is passed to contcator 39, which is equipped with stators and rotor 30, where it is contacted in countercurrent with 6 normal hydrochloric acid supplied via line 41. The phases are also separated in contactor 39. A cobalt value-rich acidic aqueous phase is separated and removed via line 42 while the metal-lean nonaqueous solution of TCD is removed via line 43 and together with the TCD from line 30 recycled to contactor 12 via line 15.

The invention will be further illustrated by the following examples. These examples are intended to set out the general principles of this invention and are not to be construed as limiting its scope.

EXAMPLE I (a) A typical dione dioxime, 4-tertiary butyl-1,2-cyclohexanedione dioxime was prepared. Technical grade 4-tertiary butylcyclohexanone was obtained. One mole (154 grams) of this ketone was dissolved in 300 cc. of ethanol in a one liter flask. To the solution was added dropwise (over a period of 3 hours) 0.9 mole of $SeO_2$ dissolved in 200 cc. of 95% ethanol. The slight deficit of $SeO_2$ reduced the formulation of polymer and gave a highly stereospecific oxidation to 1,2-diketone. The reaction mixture was held at 30° C. during $SeO_2$ addition and then maintained at 70° C. for 12 hours to carry out the reaction. The reaction mixture was then passed through diatomaceous earth to remove any unreacted $SeO_2$ and remove organo-selenium compounds. The resulting material contained about 90% by mole of the desired 1,2-diketone. The diketone was then converted to the dione dioxime. The diketone was added at 0° C. to an aqueous ethanolic solution of hydroxylamine. Excess ethanol was added. The temperature was raised 25° C. for 2 hours and then ethanol was evaporated causing the dione dioxime to separate as a white solid precipitate upon cooling. The remaining water and ethanol were evaporated and the final product was analyzed and determined to be the desired 4-tertiary butyl-1,2-cyclohexanedione dioxime (TCD). It had a melting point of 190° C. and an elemental analysis of Found (percent wt.): 61±0.5 carbon; 8.5±0.3 hydrogen; 14±0.5 nitrogen; and 16±0.5 oxygen. Calculated (percent wt.): 60.6 carbon; 9.1 hydrogen; 14.1 nitrogen; and 16.2 oxygen.

(b) The dione dioxime (TCD) of part (a) was employed as a ligand for metal value recovery. A 0.35 by weight (0.15 molar) solution of TCD in 2-ethylhexanol was prepared. Solutions of bivalent copper, (0.17 m.) nickel (0.17 m.), cobalt (0.03 m.), magnesium (0.08 m.) and iron (0.015 m.) were prepared as sulfates. The pH's of the metal value solutions were adjusted to values between 2 and 8 with sulfuric acid and ammonia. 4.5 mls. of extractant solution and 2 mls. of metal value solutions were shaken together for 10–15 minutes at 15° C. The phases were separated and the amount of each metal value extracted at these pH's was determined. The results of these experiments are given in Table I.

TABLE I

Percent extraction at various pH's

| pH | Cu | Ni | Co | Fe | Mg |
|---|---|---|---|---|---|
| 2 | 54 | 15 | 28 | 3 | 0 |
| 4 | 75 | 58 | 33 | ᴬND | 0 |
| 6 | 83 | 80 | ᴬND | ᴬND | 0 |
| 8 | 77 | 90 | 77 | ᴬND | 0 |

ᴬNot determined.

(c) Samples of the copper, cobalt and nickel complexes obtained in part (b) were treated with several mineral acids to attempt to re-dissolve the metal value. The results of these experiments given in Table II, show that while 1 normal mineral acid would dissolve the nickel and copper complexes, 6 normal acid was required to dissolve the cobalt complex.

TABLE II

Extent of Back Extraction of Metal From TCD Complexes by Acid Wash

| Acid | Complex | | |
|---|---|---|---|
| | Copper | Cobalt | Nickel |
| HCl, 1 N | C | I | C |
| HCl, 6 N | C | C | C |
| $H_2SO_4$, 1 N | C | I | C |

Note.—C=Complete; I=Incomplete.

EXAMPLE II

The selective extraction of copper, cobalt and nickel values is carried out employing other representative dione dioximes in accordance with this invention. The dione dioximes are 4-(alpha-methylpentyl)-1,2-cyclohexanedione dioxime (MCD) and 4-decyl-1,2-cyclohexanedione dioxime (DCD). These materials would be prepared by the method of Example I, part A. Solutions of MCD and DCD are prepared for use as metal extracting agents. As solvent for the MCD is employed 2-ethylhexanol, for DCD is employed benzyl alcohol. The dione dioxime concentration of these solutions is 0.15 molar. By the method of Example I, 5 ml. of portions of these solutions are shaken for 10–15 minutes with 2 ml. portions of 0.17 molar solutions of bivalent copper, and nickel, and 0.08 molar solutions of magnesium values at a variety of pH values. Results similar to those observed when TCD was used are noted with one exception, with DCD a nickel complex is formed which is soluble in the organic phase. Treatment with mineral acid frees the metal values in accord with the results of Example I.

I claim as my invention:

1. The process for selectively recovering copper, cobalt and nickel values from an aqueous solution of a pH between about pH 2 and and pH 9 which additionally contains iron values which comprises: (a) contacting an aqueous feed solution which contains iron values and at least one metal value of the group consisting of copper, cobalt and nickel values with a nonaqueous solution of 4-alkyl-1,2-cyclohexanedione dioxime, thereby selectively forming dione dioxime complexes of any copper, cobalt and nickel values and (b) separating any dione dioxime complexes of copper, cobalt and nickel values and the nonaqueous solution from the iron value-containing aqueous solution.

2. The process in accordance with claim 1 wherein the nonaqueous solution of 4-alkyl-1,2-cyclohexanedione dioxime is a solution in a 5 to 10 carbon atom nonlinear monoalkanol of a 4-alkyl-1,2-cyclohexane dione dioxime having from 3 to 12 carbon atoms in its alkyl group.

3. The process in accordance with claim 2 wherein said alkyl group contains from 3 to 6 carbon atoms.

4. The process in accordance with claim 3 wherein the aqueous feed solution contains copper, cobalt, nickel and iron values.

5. The process in accordance with claim 4 wherein any copper, cobalt and/or nickel values are liberated from their dione dioxime complexes by contact with aqueous mineral acid.

6. The process in accordance with claim 4 wherein the dione dioxime complex of nickel value is separated from the iron value-containing aqueous solution separately from the nonaqueous solution.

7. The process in accordance with claim 6 wherein the copper and cobalt values are liberated from their complexes separately by the process comprising: (a) contacting the dione dioxime complexes of copper and cobalt value and the nonaqueous solution with an aqueous solution of 1 to 2 normal mineral acid, thereby liberating the copper values from its complex and extracting it into the aqueous acid, (b) separating the copper value-containing aqueous acid extract from a nonaqueous first raffinate, (c) contacting this first raffinate with 5 to 6 normal aqueous mineral acid, thereby liberating the cobalt value and extracting it into the second aqueous acid extract and (d) separating this cobalt value-containing aqueous acid second extract from the nonaqueous second raffinate.

References Cited
UNITED STATES PATENTS

| | | | |
|---|---|---|---|
| 3,224,873 | 12/1965 | Swanson | 75—101 BE |
| 3,284,501 | 11/1966 | Swanson | 75—101 BE |
| 3,428,449 | 2/1969 | Swanson | 75—117 |
| 3,655,347 | 4/1972 | Mattison et al. | 75—117 |

HERBERT T. CARTER, Primary Examiner

U.S. Cl. X.R.

75—101 BE, 117, 119; 260—438, 439, 566 A; 423—139